United States Patent
Ueda et al.

(10) Patent No.: US 8,288,047 B2
(45) Date of Patent: Oct. 16, 2012

(54) FUEL CELL SYSTEM WITH IDLE STOP UNIT AND CURRENT DISCHARGER

(75) Inventors: Kenichiro Ueda, Wako (JP); Junji Uehara, Wako (JP); Yuji Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 419 days.

(21) Appl. No.: 12/604,328

(22) Filed: Oct. 22, 2009

(65) Prior Publication Data

US 2010/0129692 A1 May 27, 2010

(30) Foreign Application Priority Data

Nov. 26, 2008 (JP) ................................ 2008-300321

(51) Int. Cl.
*H01M 8/04* (2006.01)

(52) U.S. Cl. .................. 429/431; 429/432; 429/444

(58) Field of Classification Search .................. 429/400, 429/430, 513, 431, 432, 444, 450, 434, 442
See application file for complete search history.

(56) References Cited

U.S. PATENT DOCUMENTS

| | | | | |
|---|---|---|---|---|
| 6,936,359 | B2 * | 8/2005 | Kobayashi et al. | 429/415 |
| 7,470,479 | B2 * | 12/2008 | Kobayashi et al. | 429/415 |
| 2003/0186093 | A1 * | 10/2003 | St-Pierre et al. | 429/13 |
| 2006/0228599 | A1 * | 10/2006 | Takaiwa | 429/22 |
| 2007/0264541 | A1 * | 11/2007 | Yanase et al. | 429/13 |
| 2008/0187790 | A1 * | 8/2008 | Kamihara et al. | 429/13 |

FOREIGN PATENT DOCUMENTS

| | | | |
|---|---|---|---|
| JP | 2006/147404 A1 * | 6/2006 | |
| JP | 2006-156017 | 6/2006 | |
| JP | 2006-294304 | 10/2006 | |

OTHER PUBLICATIONS

Machine Translation of: JP 2006294304 A, Goto et al., Oct. 2006.*
Japanese Office Action for corresponding JP Application No. 2008-300321, May 2, 2011.

* cited by examiner

*Primary Examiner* — Jonathan Crepeau
*Assistant Examiner* — Kenneth Douyette
(74) *Attorney, Agent, or Firm* — Ditthavong Mori & Steiner, P.C.

(57) ABSTRACT

A fuel cell system includes an idle stop unit, a discharger, a power-generation-state memory, and an initial-current-value setter. The idle stop unit is configured to stop a supply of the reactant gas to a fuel cell. The discharger is configured to allow the fuel cell to generate the electric power with the reactant gas remaining in the fuel cell after the idle stop unit stops the supply of the reactant gas and is configured to discharge electric current to a current receiver. The power-generation-state memory is configured to store a power-generation state of the fuel cell immediately before the idle stop unit stops the supply of the reactant gas. The initial-current-value setter is configured to set an initial current value of the fuel cell discharged by the discharger on a basis of the power-generation state of the fuel cell stored in the power-generation-state memory.

10 Claims, 6 Drawing Sheets

ABSTRACT

FUEL CELL SYSTEM WITH IDLE STOP UNIT AND CURRENT DISCHARGER

CROSS-REFERENCE TO RELATED APPLICATIONS

The present application claims priority under 35 U.S.C. §119 to Japanese Patent Application No. 2008-300321, filed Nov. 26, 2008. The contents of this application are incorporated herein by reference in their entirety.

BACKGROUND OF THE INVENTION

1. Field of the Invention

The present invention relates to a fuel cell system.

2. Discussion of the Background

A fuel cell vehicle (fuel cell movable body) has been rapidly developed, which includes a fuel cell such as a polymer electrolyte fuel cell (PEFC) and is driven by operating an electric drive motor with power generated by the fuel cell.

In such a fuel cell vehicle, to decrease fuel consumption, that is, to decrease consumption of hydrogen (reactant gas), for example, a technique has been suggested (see Japanese Unexamined Patent Application Publication No. 2006-294304), in which supply of hydrogen and air to a fuel cell is stopped (this state is called idle stop) if an idle state is continued because of waiting for signal and hence a predetermined condition is established.

The technique continues power generation of the fuel cell, i.e., continues discharge from the fuel cell even after the idle stop, and allows hydrogen and air remaining in the fuel cell to be consumed, thereby preventing the fuel cell from being left at a high voltage.

When the idle stop is started, if an electric current value of the fuel cell for discharge is set to a constant value regardless of a power-generation state of the fuel cell before the idle stop, the electric current value may markedly vary. Consequently, a voltage value of the fuel cell may also markedly vary. For example, in a case where a fuel cell, in which power is generated at a high current value, is subjected to idle stop, when the electric current value varies and becomes a low current value, a voltage value of the fuel cell is rapidly increased.

When the voltage value of the fuel cell rapidly varies, for example, an internal circuit is formed in a unit cell of the fuel cell. Current may flow through the internal circuit, resulting in the fuel cell (electrolyte membrane, electrode, catalyst, etc.) being degraded.

SUMMARY OF THE INVENTION

According to one aspect of the present invention, a fuel cell system includes a fuel cell, an idle stop unit, a current receiver, a discharger, a power-generation-state memory, and an initial-current-value setter. The fuel cell is configured to generate electric power using reactant gas supplied to the fuel cell. The idle stop unit is configured to stop a supply of the reactant gas to the fuel cell when a predetermined condition is established. The current receiver is configured to receive electric current generated by the fuel cell. The discharger is configured to allow the fuel cell to generate the electric power with the reactant gas remaining in the fuel cell after the idle stop unit stops the supply of the reactant gas and configured to discharge electric current to the current receiver. The power-generation-state memory is configured to store a power-generation state of the fuel cell immediately before the idle stop unit stops the supply of the reactant gas. The initial-current-value setter is configured to set an initial current value of the fuel cell discharged by the discharger on a basis of the power-generation state of the fuel cell stored in the power-generation-state memory.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
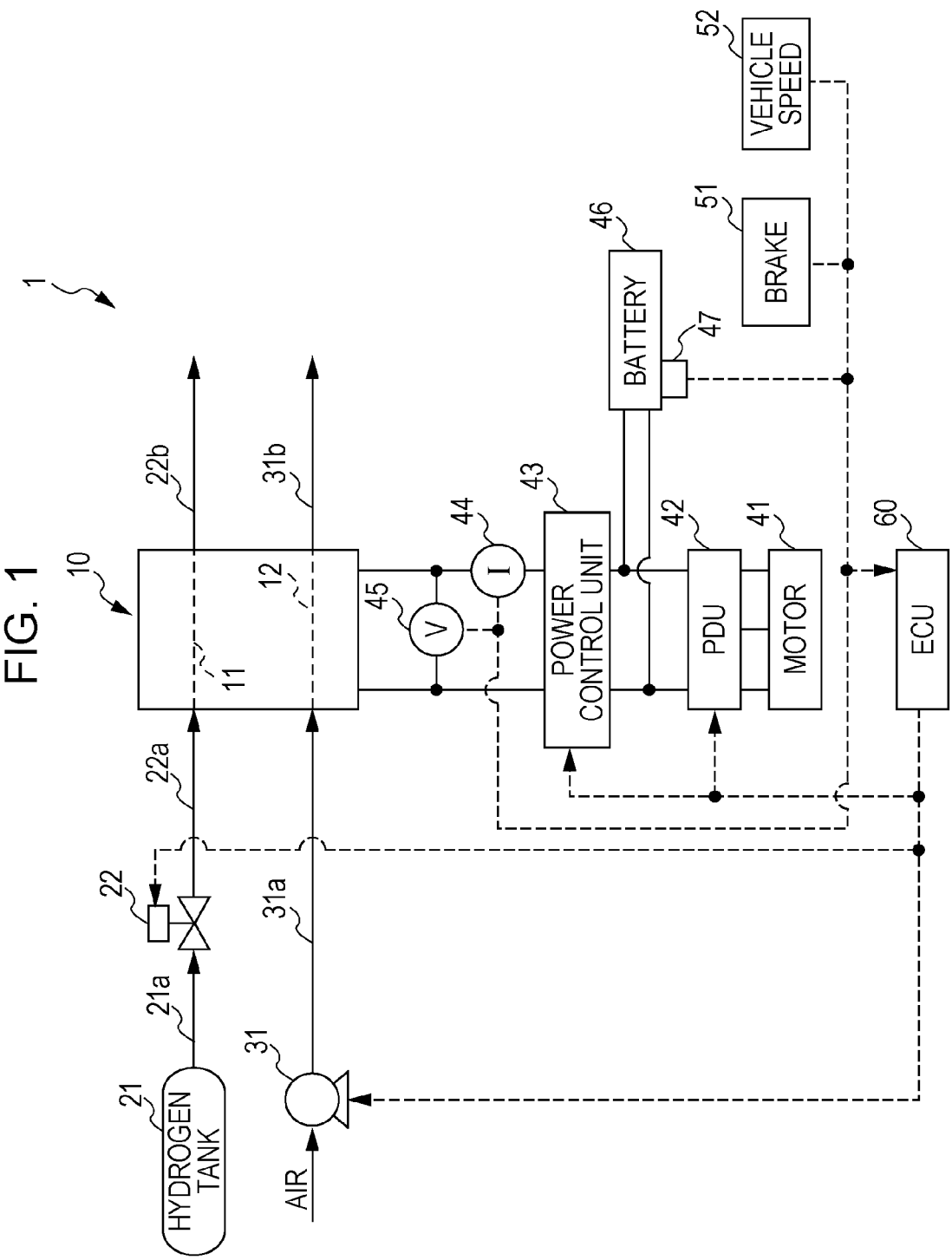
FIG. 1 illustrates a configuration of a fuel cell system according to an embodiment of the present invention.

Embodiments will now be described with reference to the accompanying drawings, wherein like reference numerals designate corresponding or identical elements throughout the various drawings. An embodiment of the present invention will be described with reference to FIGS. 1 to 6.

<<Configuration of Fuel Cell System>>

A fuel cell system 1 according to this embodiment shown in FIG. 1 is mounted on a fuel cell automobile (movable body), which is not shown. The fuel cell system 1 includes a fuel cell stack 10, an anode system, a cathode system, a power consumption system, a brake pedal 51, and an electronic control unit (ECU) 60. The anode system supplies and exhausts hydrogen (fuel gas, reactant gas) to and from an anode of the fuel cell stack 10. The cathode system supplies and exhausts air (oxidizer gas, reactant gas) containing oxygen to and from a cathode of the fuel cell stack 10. The power consumption system, for example, consumes power generated by the fuel cell stack 10. The ECU 60 provides electronic control for these components.

<Fuel Cell Stack>

The fuel cell stack 10 includes a plurality of (e.g., 200 to 400) solid polymer unit cells stacked therein. The plurality of unit cells are connected in series. Each unit cell includes a membrane electrode assembly (MEA) and two conductive separators which sandwich the MEA. The MEA includes an electrolyte membrane (solid polymer membrane) formed of a monovalent cation-exchange membrane or the like, and an anode and a cathode (electrodes) which sandwich the electrolyte membrane.

The anode and cathode are formed of a conductive porous body, such as carbon paper. The anode and cathode include catalysts (Pt, Ru, etc.) for causing electrode reaction at the anode and cathode.

Each separator has grooves for supplying hydrogen or air over an entire surface of the corresponding MEA, and through holes for supplying and exhausting hydrogen or air to and from all unit cells. The grooves and through holes function as an anode channel 11 (fuel gas channel) and a cathode channel 12 (oxidizer gas channel).

When hydrogen is supplied to each anode through the anode channel 11 and air is supplied to each cathode through the cathode channel 12, electrode reaction occurs, and a potential difference in (or open circuit voltage, OCV) is generated at each unit cell. Then, a power control unit 43 (described later) is controlled and current is acquired while the OCV is a predetermined OCV or higher. Thusly, the fuel cell stack 10 generates power.

Figure 3:
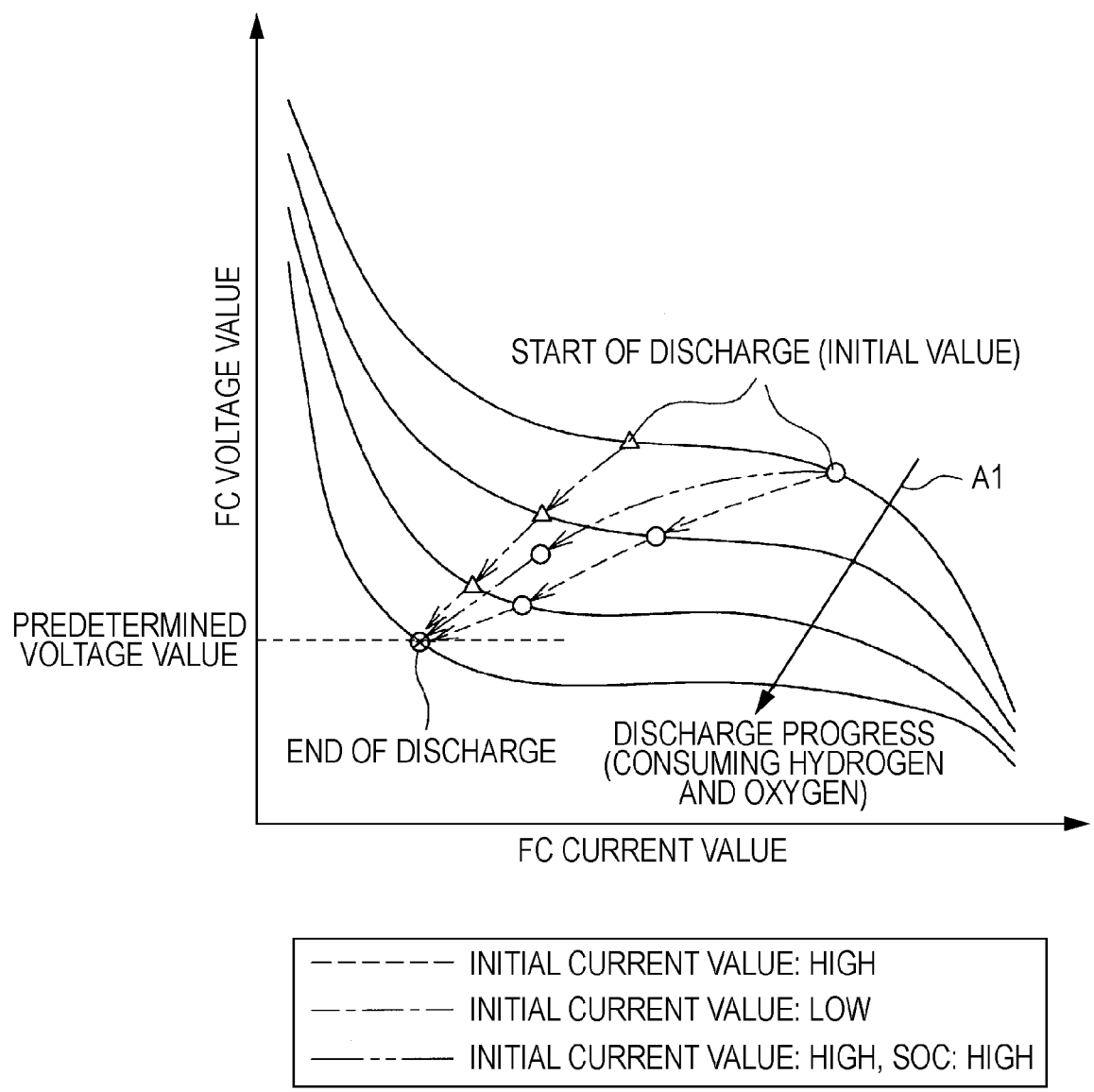
FIG. 3 is a graph showing IV characteristics of a fuel cell stack.

The fuel cell stack 10 has an IV characteristic (current-voltage characteristic) as shown in FIG. 3. After idle stop in which supply of hydrogen and air is stopped, when discharge of the fuel cell stack 10 progresses, hydrogen and air substantially become insufficient. Accordingly, an IV curve becomes gradually lowered (see arrow A1).

<Anode System>

The anode system includes a hydrogen tank 21 and a normally closed shut-off valve 22.

The hydrogen tank 21 is connected to an inlet of the anode channel 11 through a pipe 21a, the shut-off valve 22, and a pipe 22a. When the shut-off valve 22 is opened under an instruction from the ECU 60, hydrogen is supplied from the hydrogen tank 21 to the anode channel 11 through the shut-off valve 22 etc.

A pipe 22b is connected to an outlet of the anode channel 11. Anode off-gas exhausted from the anode channel 11 and containing unconsumed hydrogen is exhausted to the outside of the vehicle through the pipe 22b.

<Cathode System>

The cathode system includes a compressor 31.

The compressor 31 is connected to an inlet of the cathode channel 12 through a pipe 31a. When the compressor 31 is operated under an instruction from the ECU 60, the compressor 31 acquires air containing oxygen, and supplies the air to the cathode channel 12. The compressor 31 uses the fuel cell stack 10 and/or a battery 46 (described later) as a power source. Also, a humidifier (not shown) is provided at the pipe 31a, to humidify air which is directed to the cathode channel 12.

A pipe 31b is connected to an outlet of the cathode channel 12. Cathode off-gas with high humidity exhausted from the cathode channel 12 is exhausted to the outside of the vehicle through the pipe 31b.

<Power Consumption System>

The power consumption system includes a motor 41, a power drive unit (PDU) 42, a power control unit 43, a current sensor 44, a voltage sensor 45, a battery 46 (charge storage device, current receiving unit), and a state of charge (SOC) sensor 47 (chargeable amount sensor). The motor 41 is connected to an output terminal of the fuel cell stack 10 through the PDU 42 and the power control unit 43. The battery 46 is arranged between the PDU 42 and the power control unit 43 and connected to both.

The motor 41 is an electric motor which serves as a power source of the fuel cell automobile. The PDU 42 is an inverter which converts direct current into three-phase alternating current and supplies the three-phase alternating current to the motor 41 under an instruction from the ECU 60. The power control unit 43 controls power (current value, voltage value) generated by the fuel cell stack 10, and controls charge and discharge of the battery 46, under an instruction from the ECU 60. The power control unit 43 includes electronic circuits, such as a DC/DC chopper, DC/DC converter, etc.

Even during the idle stop in which the supply of hydrogen and air to the fuel cell stack 10 is stopped, under the control of the ECU 60 for the power control unit 43, the fuel cell stack 10 consumes hydrogen and air remaining in the fuel cell stack 10 to generate power, that is, to perform discharge. Current of the power generated by the fuel cell stack 10 for discharge during the idle stop, is supplied to the battery 46.

Thus, a discharge unit causes the fuel cell stack 10 to generate power with the remaining hydrogen and air and to supply the current of the generated power to the battery 46 during the idle stop, in which the supply of hydrogen and air is stopped. The discharge unit includes the power control unit 43 and the ECU 60 which controls the power control unit 43.

The current sensor 44 detects an electric current value of the fuel cell stack 10. The current sensor 44 outputs the detected current value to the ECU 60. The voltage sensor 45 detects a voltage value of the fuel cell stack 10. The voltage sensor 45 outputs the detected voltage value to the ECU 60.

The battery 46 charges dump power of the fuel cell stack 10 and regenerative power from the motor 41. When an amount of the power generated by the fuel cell stack 10 is small, the battery 46 discharges the charged power to assist the fuel cell stack 10. Also, the battery 46 serves as a current receiving unit for the current of the power generated and discharged by the fuel cell stack 10 during the idle stop. The battery 46 may include, for example, a plurality of lithium-ion secondary batteries.

The SOC sensor 47 detects a state of charge (SOC) of the battery 46. The SOC sensor 47 includes a voltage sensor (not shown) which detects a voltage value of the battery 46. The SOC sensor 47 calculates a SOC on the basis of the detected voltage value, and outputs the calculated SOC to the ECU 60. Alternatively, the ECU 60 may calculate a SOC of the battery 46 on the basis of the voltage value of the battery 46.

<Brake Pedal and Others>

The brake pedal 51 is depressed by a driver when braking is applied to the fuel cell automobile. The brake pedal 51 is arranged at a foot area of a driver seat. The brake pedal 51 outputs a depression signal to the ECU 60.

A vehicle speed sensor 52 detects a vehicle speed of the fuel cell automobile. The vehicle speed sensor 52 outputs the detected vehicle speed to the ECU 60.

<ECU>

The ECU 60 is a control device which provides electronic control for the fuel cell system 1. The ECU 60 includes a CPU, a ROM, a RAM, various interfaces, electronic circuits, etc. The ECU 60 controls various equipment and executes various processing on the basis of a program stored in the ECU 60.

<ECU, Idle Stop Function>

The ECU 60 (idle stop unit) has an idle stop function which determines that idle stop is possible in a case where a predetermined condition is established, closes the shut-off valve 22 to stop the supply of the hydrogen, and stops the compressor 31 to stop the supply of the air. The case where the predetermined condition is established is a case where the brake pedal 51 is depressed for a predetermined time (for example, 10 seconds), and the vehicle speed is continuously zero for the predetermined time.

<ECU, Power-Generation-State Storage Function>

The ECU 60 (power-generation-state storage unit) has a function which stores in the RAM an electric current value (power-generation state) of the fuel cell stack 10 input from the current sensor 44 and a voltage value (power-generation state) of the fuel cell stack 10 input from the voltage sensor 45. That is, the ECU 60 has a power-generation-state storage function which stores an electric current value and a voltage value (power-generation state) immediately before the idle stop.

<ECU, Initial-Current-Value Setting Function>

The ECU 60 (initial-current-value setting unit) has an initial-current-value setting function which sets an initial current value at the start of the discharge on the basis of the electric current value immediately before the idle stop. In particular, the electric current value immediately before the idle stop is set as an initial current value at the start of the discharge.

Alternatively, an electric current value immediately before the idle stop may be calculated on the basis of a voltage value immediately before the idle stop and an IV characteristic (see FIG. 3) of the fuel cell stack 10, and the calculated current value may be set as an initial current value at the start of the discharge.

<ECU, Discharge Function>

The ECU 60 (discharge unit) has a function which allows discharge of the fuel cell stack 10 and supplies the current of the generated power to the battery 46 until the voltage value of the fuel cell stack 10 is decreased to a predetermined voltage value, by controlling the power control unit 43, when the above-mentioned predetermined condition has been established and the idle stop has been started. During the idle stop, the PDU 42 is not controlled, and three-phase alternating current is not generated.

Also, the ECU 60 has a function which gradually decreases the electric current value of the fuel cell stack 10 during discharge, from the above-mentioned initial current value, by controlling the power control unit 43. In this case, the ECU 60 has a function which increases a decrease rate (A/s) of the electric current value to be decreased during the discharge as the initial current value is higher and/or as the SOC of the battery 46 is higher (i.e., as a chargeable amount is smaller).

<<Operation of Fuel Cell System>>

Figure 2:
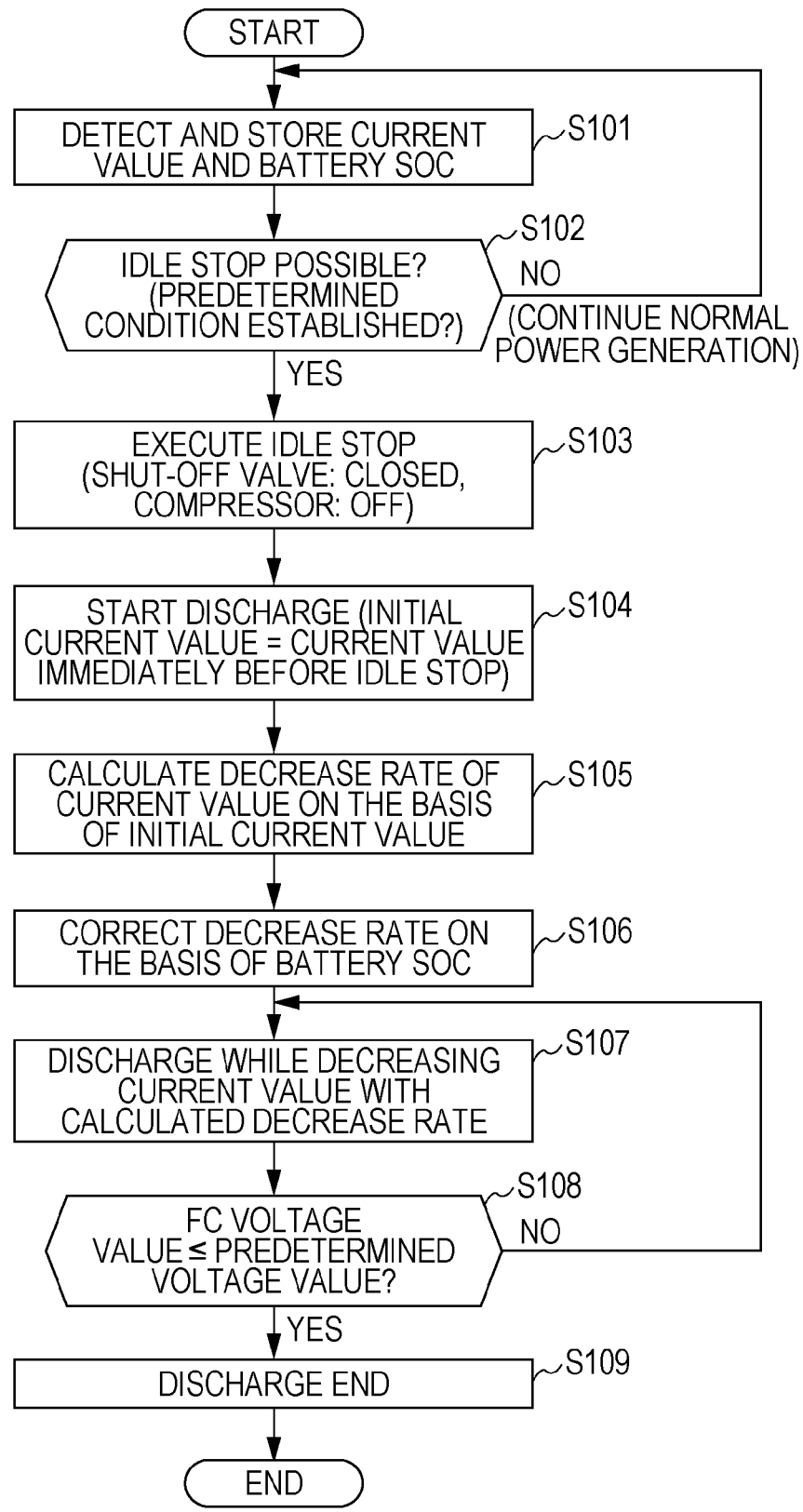
FIG. 2 is a flowchart showing an operation of the fuel cell system according to the embodiment.

With reference to FIG. 2, an operation of the fuel cell system 1 will be described below with a flow of the program (flowchart) set in the ECU 60. In an initial state, the fuel cell stack 10 performs normal power generation in accordance with an accelerator opening (required power to be generated) etc.

In step S101, the ECU 60 causes the current sensor 44 to detect an electric current value of the power of the normal power generation by the fuel cell stack 10, and stores the detected current value in the RAM.

Also, the ECU 60 causes the SOC sensor 47 to detect a SOC of the battery 46, and stores the detected SOC in the RAM.

In step S102, the ECU 60 determines whether the idle stop is possible, that is, whether a predetermined condition is established.

If it is determined that the predetermined condition is established and the idle stop is possible (S102, YES), the processing of the ECU 60 goes to step S103. In contrast, if it is determined that the predetermined condition is not established and the idle stop is not possible (S102, NO), the processing of the ECU 60 goes to S101, and the fuel cell stack 10 continuously performs the normal power generation.

In step S103, the ECU 60 executes (starts) the idle stop.

In particular, the ECU 60 closes the shut-off valve 22 to stop the supply of the hydrogen to the anode channel 11. Simultaneously, the ECU 60 stops the compressor 31 to stop the supply of the air to the cathode channel 12. Accordingly, waste consumption of the hydrogen is stopped, and fuel consumption is decreased (i.e., utilization efficiency of the hydrogen is increased).

In step S104, the ECU 60 starts discharge of the fuel cell stack 10 with the hydrogen and air remaining in the fuel cell stack 10, and supplies the current (discharge current) of the generated power to the battery 46, by controlling the power control unit 43.

In this case, the ECU 60 sets the electric current value of the fuel cell stack 10 immediately before the idle stop stored in the RAM to an initial current value at the start of the discharge. The ECU 60 starts the discharge with this initial current value. Accordingly, the electric current value of the fuel cell stack 10 does not vary at the start of the discharge, and the voltage value does not vary. Thus, the fuel cell stack 10 is not degraded because of variation in voltage at the start of the discharge. Durability of the fuel cell stack 10 is not decreased.

In step S105, the ECU 60 calculates a decrease rate of the electric current value on the basis of the initial current value at the start of the discharge so that the electric current value of the fuel cell stack 10 is gradually decreased during the discharge. The decrease rate is, for example, calculated on the basis of the initial current value of this time and a map shown in FIG. 4 which is obtained through a preliminary test or the like.

Figure 4:
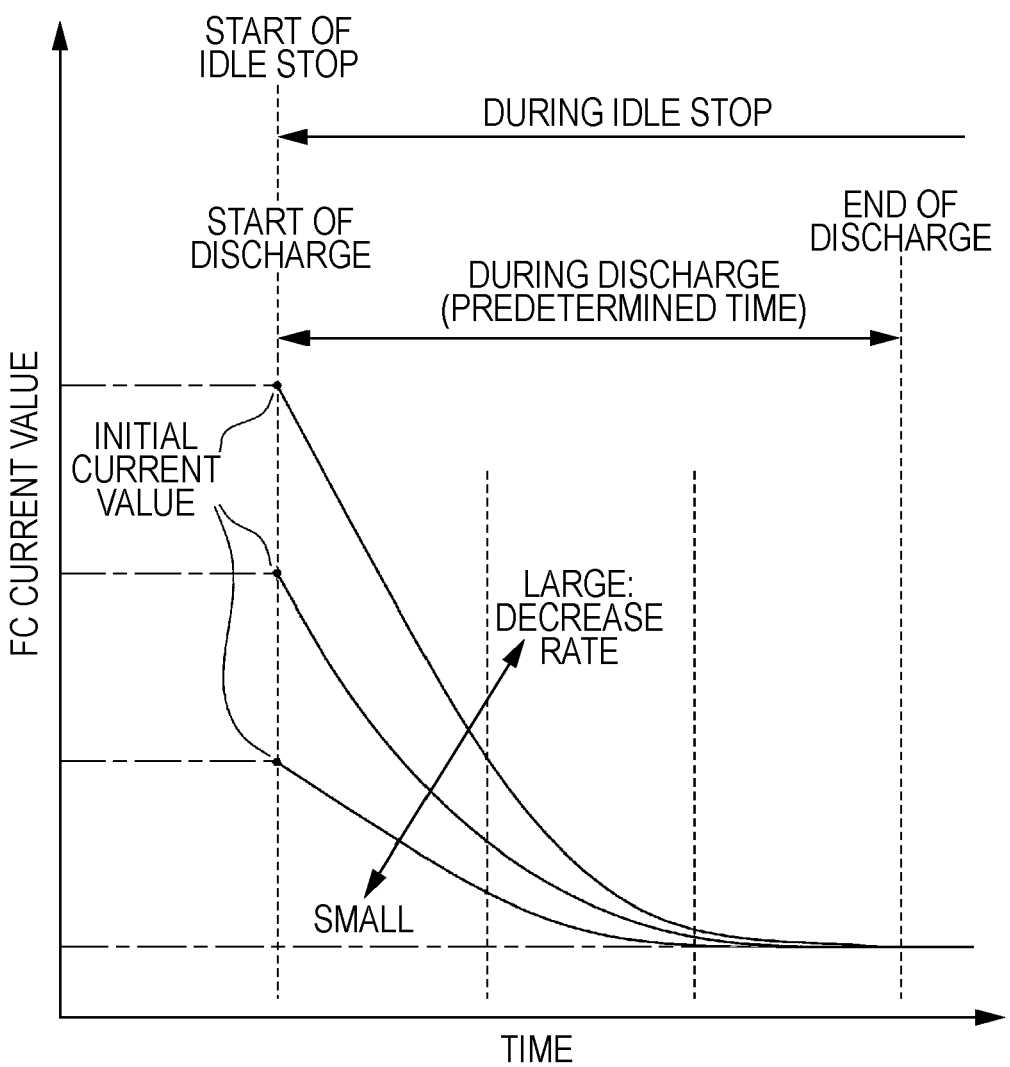
FIG. 4 is a map showing current values of the fuel cell stack during discharge.

To be more specific, referring to FIGS. 3 and 4, the decrease rate (decrease ratio) of the electric current value during discharge is increased as the initial current value is higher (see FIG. 4) so that the voltage value of the fuel cell stack 10 is decreased to a predetermined voltage value (see FIG. 3) when a predetermined time elapses from the start of the discharge, regardless of the electric current value and the voltage value before the idle stop.

Accordingly, the electric current value of the fuel cell stack 10 at the end of the discharge can be decreased regardless of the electric current value and the voltage value before the idle stop. Thus, even when the electric current value is zero at the end of the discharge, the variation in current value is decreased. Hence, the variation in voltage value at the end of the discharge is also decreased. The fuel cell stack 10 can be prevented from being degraded.

Referring to FIG. 4, the decrease rate of the electric current value during the discharge is increased after the start of the discharge and then is gradually decreased. In particular, the electric current value during discharge is markedly decreased after the discharge is started, then is gradually decreased, and the discharge is ended.

Accordingly, a voltage drop of the fuel cell stack 10 immediately before the end of the discharge can be decreased, and the end of the discharge can be correctly determined on the basis of the voltage value of the fuel cell stack 10 (detected value of the voltage sensor 45). That is, an erroneous operation, in which the discharge is ended although dischargeable hydrogen and air are left, can be prevented.

Figure 5:
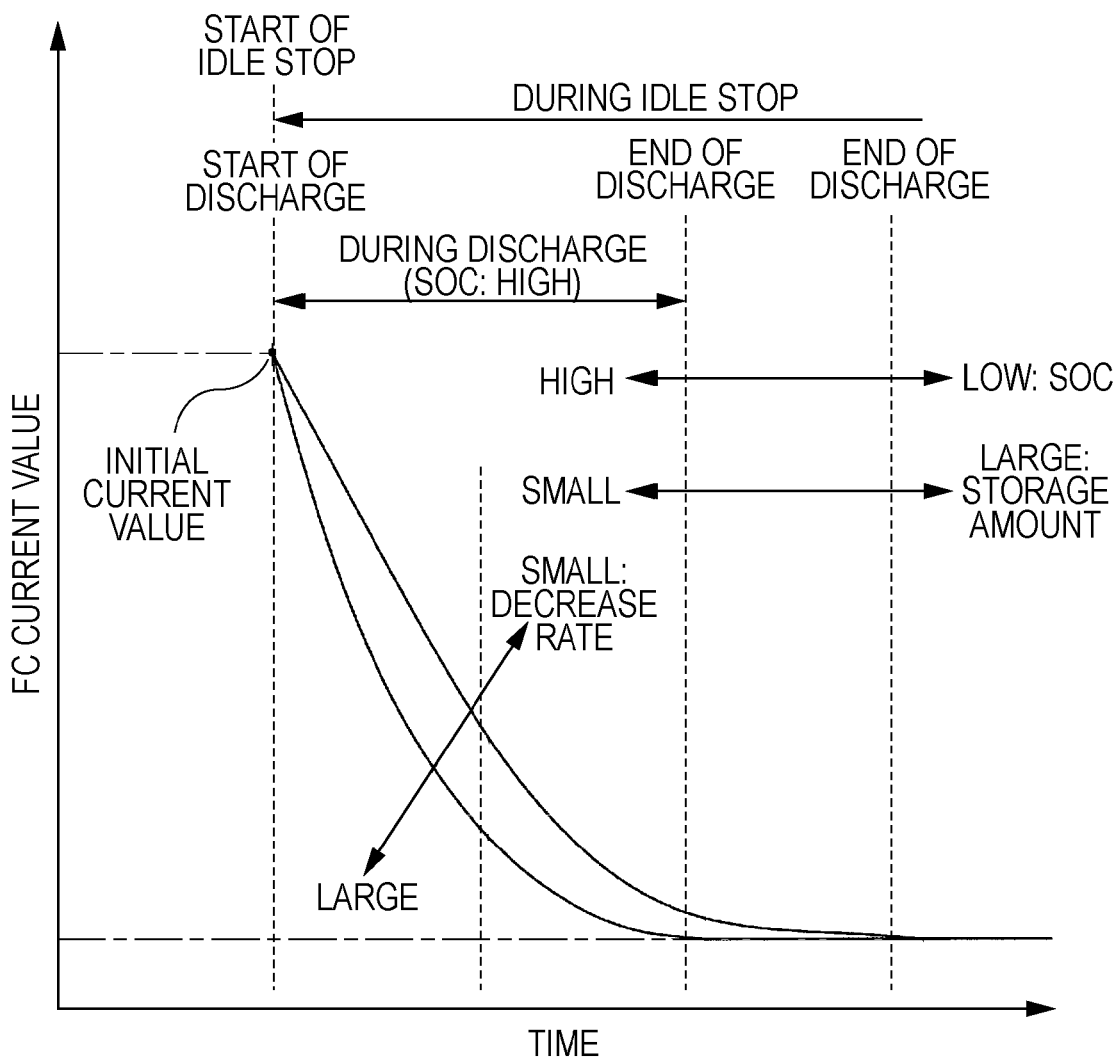
FIG. 5 is a map showing current values of the fuel cell stack during the discharge.

In step S106, the ECU 60 corrects the decrease rate of the electric current value calculated in step S105 to prevent a situation from occurring, in which the electric current value becomes zero rapidly from a high value because the SOC of the battery 46 becomes a predetermined SOC (permissible chargeable amount, for example, 70% or higher) or because the battery 46 becomes full during the discharge, on the basis of the SOC before the start of the discharge (immediately before the idle stop) detected and stored in the step S101 and the map shown in FIG. 5 obtained through the preliminary test or the like.

In particular, a time until the battery 46 becomes full from the start of the discharge is decreased as the SOC of the battery 46 before the start of the discharge is higher and the chargeable amount thereafter is smaller. The decrease rate is increased such that the electric current value during the discharge is decreased until that time elapses (see FIG. 5).

Accordingly, the electric current value during the discharge can be markedly decreased, and the electric current value at the end of the discharge when the battery 46 becomes full can be decreased. Thus, even when the electric current value is zero at the end of the discharge, the variation in current value is decreased, and the variation in voltage value at the end of the discharge is decreased. The fuel cell stack 10 can be prevented from being degraded.

In step S107, the ECU 60 decreases the electric current value with the decrease rate calculated in step S105 and corrected in step S107, and performs the discharge from the fuel cell stack 10. Then, the remaining hydrogen and air are consumed, and the voltage value of the fuel cell stack 10 is gradually decreased (see FIG. 3).

In step S108, the ECU 60 determines whether the voltage value of the fuel cell stack 10 detected through the voltage sensor 45 is decreased to a predetermined voltage value or lower (see FIG. 3).

If it is determined that the voltage value of the fuel cell stack 10 is a predetermined voltage value or lower (S108, YES), the processing of the ECU 60 goes to step S109. In contrast, if it is determined that the voltage value of the fuel cell stack 10 is not the predetermined voltage value or lower (S108, NO), the processing of the ECU 60 goes to step S107.

In step S109, the ECU 60 stops the control of the power control unit 43, so that the discharge of the fuel cell stack 10 is ended.

Then, the processing of the ECU 60 goes to END, and the idle stop is continued. For example, in a case where the brake pedal 51 is turned OFF and an accelerator pedal (not shown) is depressed when the predetermined condition is established and during the processing of steps S103 to S109 after the idle stop, the idle stop is released, and the processing of steps S103 to S109 is interrupted.

<<Advantages of Fuel Cell System>>

With the fuel cell system 1, the following advantages can be obtained.

Figure 6:
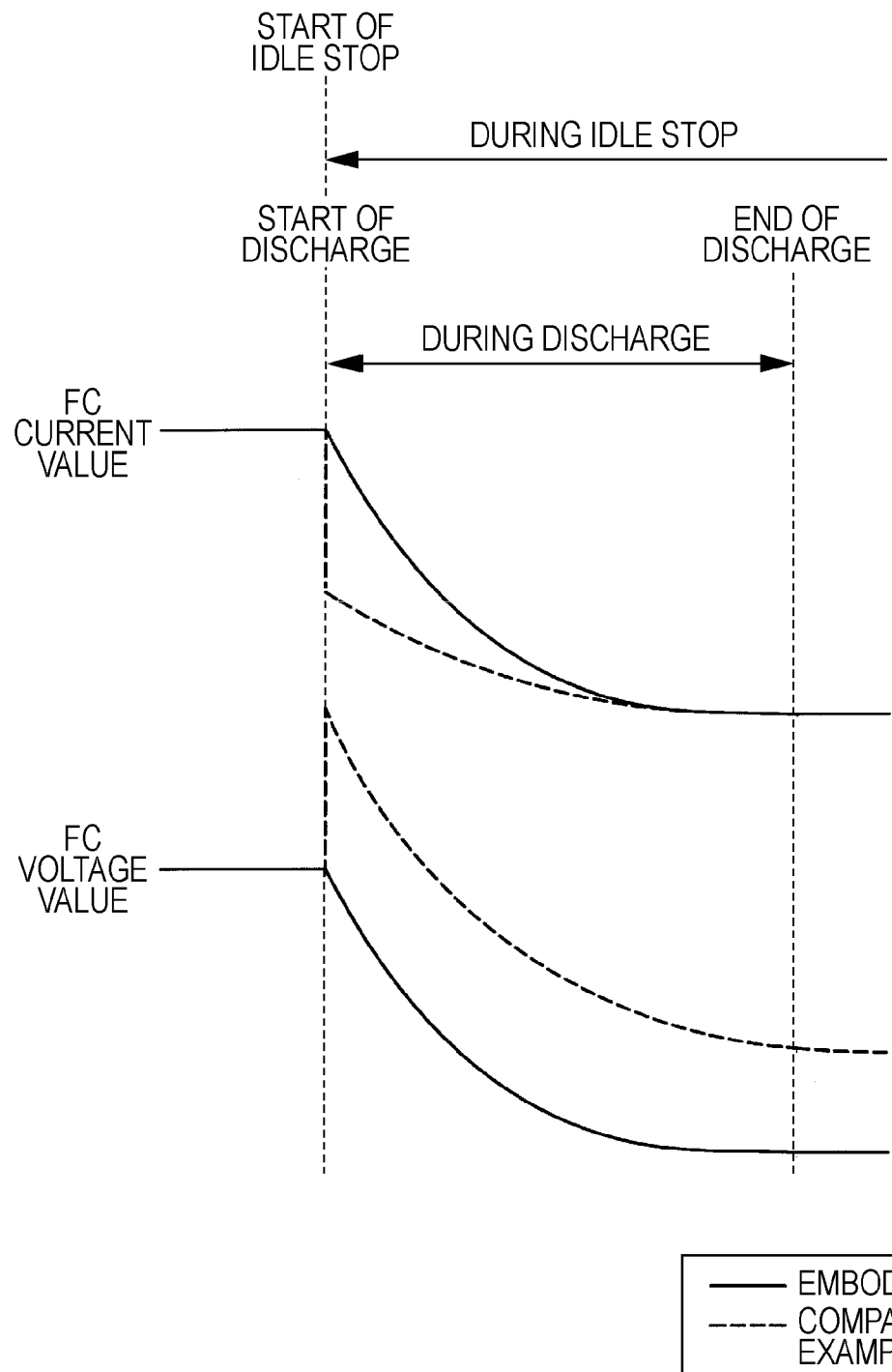
FIG. 6 is a time chart showing an example operation of the fuel cell system according to the embodiment.

Referring to FIG. 6, since the initial current value of the fuel cell stack 10 at the start of the discharge is set as the electric current value immediately before the idle stop, the voltage value of the fuel cell stack 10 does not markedly vary at the start of the discharge (embodiment). Accordingly, the fuel cell stack 10 can be prevented from being degraded at the start of the discharge.

In contrast, if the initial current value at the start of the discharge is decreased, the initial voltage value is markedly increased, and the fuel cell stack 10 may be degraded (comparative example).

Also, referring to FIG. 4, the electric current value of the fuel cell stack 10 is gradually decreased during the discharge. Hence, the variation in current value at the end of the discharge is decreased even when the electric current value at the end of the discharge is zero. Accordingly, the variation in voltage value at the end of the discharge is also decreased. The fuel cell stack 10 can be prevented from being degraded (see FIG. 3).

Further, the decrease rate of the electric current value to be decreased during the discharge is increased as the initial current value is higher. Hence, the electric current value at the end of discharge can be decreased.

Furthermore, referring to FIG. 5, the decrease rate of the electric current value to be decreased during the discharge is increased as the SOC before the start of the discharge is higher. Hence, the electric current value at the end of the discharge can be decreased.

The embodiment of the present invention has been described above, however, the present invention is not limited thereto, and may be modified as follows within the scope of the present invention.

In the above-described embodiment, while the current receiving unit which receives the current of the power generated by the fuel cell stack 10 during the discharge is the battery 46, it is not limited thereto. For example, the current receiving unit may be a resistance (discharge resistance) which converts the current of the generated power into heat.

In the above-described embodiment, while the fuel cell system 1 is mounted on the fuel cell automobile, it is not limited thereto. For example, the fuel cell system 1 may be a fuel cell system which is mounted on a fuel cell movable body, such as a motor bicycle, a train, or a ship. Also, the present invention may be applied to a home stationary fuel cell system, or a fuel cell system included in a water heater system.

An embodiment of the present invention provides a fuel cell system including a fuel cell which generates power when reactant gas is supplied to the fuel cell; an idle stop unit which stops the supply of the reactant gas to the fuel cell when a predetermined condition is established; a current receiving unit which receives current of the power generated by the fuel cell; a discharge unit which allows the fuel cell to generate the power with the reactant gas remaining in the fuel cell after the idle stop unit stops the supply of the reactant gas, and supplies the current of the generated power to the current receiving unit; a power-generation-state storage unit which stores a power-generation state of the fuel cell immediately before the idle stop unit stops the supply of the reactant gas; and an initial-current-value setting unit which sets an initial current value of the fuel cell by the discharge unit on the basis of the power-generation state of the fuel cell stored in the power-generation-state storage unit.

With such a fuel cell system, the initial-current-value setting unit sets the initial current value of the fuel cell by the discharge unit on the basis of the power-generation state of the fuel cell immediately before the supply of the reactant is stopped (immediately before the idle stop), the state being stored in the power-generation-state storage unit. Then, the discharge unit allows the fuel cell to generate the power and supplies the current of the generated power to the current receiving unit on the basis of the set initial current value.

As described above, since the initial current value is set on the basis of the power-generation state (current value, voltage value, etc.) immediately before the idle stop, the electric current value of the fuel cell at the start of the discharge (start of idle stop) does not markedly vary. Accordingly, the voltage value of the fuel cell at the start of the discharge does not markedly vary. Thus, the fuel cell can be prevented from being degraded as a result of variation in voltage, and the idle stop can be applied to the fuel cell system without durability of the system being decreased.

When the discharge progresses while the supply of the reactant gas is stopped, the reactant gas becomes insufficient in the fuel cell. Hence, an IV curve becomes lowered, and the voltage value is decreased (see FIG. 3).

Preferably, the discharge unit may gradually decrease the electric current value of the fuel cell during discharge from the initial current value.

With such a fuel cell system, since the discharge unit gradually decreases the electric current value of the fuel cell during the discharge from the initial current value, the electric current value of the fuel cell at the end of the discharge can be decreased.

Even when the discharge is ended and the electric current value becomes zero, variation in voltage value at the end of the discharge is decreased. Hence, the fuel cell can be prevented from being degraded.

Preferably, the current receiving unit may be a charge storage device, and the discharge unit may increase a decrease rate (decrease ratio per unit time) of the electric current value to be decreased during the discharge as a chargeable amount of the charge storage device is smaller.

With such a fuel cell system, the discharge unit increases the decrease rate of the electric current value to be decreased during the discharge as the chargeable amount of the charge storage device is smaller. Accordingly, when the chargeable amount of the charge storage device reaches an upper limit value, that is, when the charge storage device becomes full and the discharge is to be ended, the electric current value of the fuel cell can be decreased.

Even when the discharge is ended and the electric current value becomes zero, variation in voltage value at the end of the discharge is decreased. Hence, the fuel cell can be prevented from being degraded.

Preferably, the discharge unit may allow the fuel cell to generate the power, supply the current of the generated power to the current receiving unit, and increase a decrease rate of the electric current value to be decreased during the discharge as the initial current value is higher, until a voltage value of the fuel cell is decreased to a predetermined voltage value.

With such a fuel cell system, since the discharge unit increases the decrease rate of the electric current value to be decreased during the discharge as the initial current value is higher, the electric current value of the fuel cell at the end of the discharge can be decreased.

Even when the discharge is ended and the electric current value becomes zero, variation in voltage value at the end of the discharge is decreased. Hence, the fuel cell can be prevented from being degraded.

The reactant gas may remain in the fuel cell by a large amount. When the discharge is thus possible but a large voltage drop occurs because of an internal resistance of the fuel cell, the voltage value of the fuel cell is decreased to a predetermined voltage, and hence the discharge may be erroneously ended.

However, as described above, since the decrease rate of the electric current value is increased to decrease the electric current value, the voltage value of the fuel cell can be prevented from being decreased because of the voltage drop. Accordingly, the discharge can be properly ended while the remaining reactant gas is properly consumed by the discharge.

Preferably, the power-generation-state storage unit may store a voltage value of the fuel cell immediately before the idle stop unit stops the supply of the reactant gas, and the initial-current-value setting unit may set the initial current value on the basis of the voltage value of the fuel cell and a current-voltage characteristic of the fuel cell.

With such a fuel cell system, the initial-current-value setting unit can set the initial current value during the discharge on the basis of the voltage value of the fuel cell immediately before the idle stop stored in the power-generation-state storage unit and the current-voltage characteristic (IV characteristic) of the fuel cell.

With the embodiment of the present invention, the fuel cell system capable of performing the idle stop while preventing the fuel cell from being degraded can be provided.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A fuel cell system comprising:
   a fuel cell configured to generate electric power using reactant gas supplied to the fuel cell;
   a current receiver configured to receive electric current generated by the fuel cell; and
   a controller programmed to provide:
      an idle stop unit configured to stop a supply of the reactant gas to the fuel cell when a predetermined condition is established;
      a discharger configured to allow the fuel cell to generate the electric power with the reactant gas remaining in the fuel cell after the idle stop unit stops the supply of the reactant gas, the discharger being configured to discharge electric current to the current receiver;
      a power-generation-state memory configured to store at least one of a current value and a voltage value of the fuel cell immediately before the idle stop unit stops the supply of the reactant gas; and
      an initial-current-value setter configured to set an initial current value of the fuel cell discharged by the discharger on a basis of the at least one of the current value and the voltage value of the fuel cell stored in the power-generation-state memory.

2. The fuel cell system according to claim 1, wherein the controller is programmed to provide that the discharger decreases an electric current value of the fuel cell from the initial current value during discharge.

3. The fuel cell system according to claim 2,
   wherein the current receiver is a charge storage device, and
   wherein the controller is programmed to provide that the discharger uses a larger decrease rate of the electric current value during the discharge after the idle stop unit stops the supply of the reactant gas when a chargeable amount of the charge storage device is smaller at an outset of the discharge, and a smaller decrease rate of the electric current value during the discharge after the idle stop unit stops the supply of the reactant gas when the chargeable amount of the charge storage device is larger at the outset of the discharge.

4. The fuel cell system according to claim 2, wherein the controller is programmed to provide that the discharger allows the fuel cell to generate the power to discharge the electric current to the current receiver while increasing the decrease rate of the electric current value as the initial current value is higher during the discharge, until a voltage value of the fuel cell is decreased to a predetermined voltage value.

5. The fuel cell system according to claim 1,
   wherein the power-generation-state memory stores a voltage value of the fuel cell immediately before the idle stop unit stops the supply of the reactant gas, and
   wherein the controller is programmed to provide that the initial-current-value setter sets the initial current value on the basis of the voltage value of the fuel cell and a current-voltage characteristic of the fuel cell.

6. A fuel cell system comprising:
   power generating means for generating electric power using reactant gas supplied to the power generating means;
   current receiving means for receiving electric current generated by the power generating means; and
   a controller programmed to provide:
      idle stopping means for stopping a supply of the reactant gas to the power generating means when a predetermined condition is established;

discharging means for allowing the power generating means to generate the electric power with the reactant gas remaining in the power generating means after the idle stopping means stops the supply of the reactant gas and for discharging electric current to the current receiving means;

memorizing means for storing at least one of a current value and a voltage value of the power generating means immediately before the idle stopping means stops the supply of the reactant gas; and initial-current-value setting means for setting an initial current value of the power generating means discharged by the discharging means on a basis of at least one of the current value and the voltage value of the power generating means stored in the memorizing means.

7. The fuel cell system according to claim 6,
wherein the current receiving means is a charge storage device, and
wherein the controller is programmed to provide that the discharging means uses a larger decrease rate of the electric current value during the discharge after the idle stopping means stops the supply of the reactant gas when a chargeable amount of the charge storage device is smaller at an outset of the discharge, and a smaller decrease rate of the electric current value during the discharge after the idle stopping means stops the supply of the reactant gas when the chargeable amount of the charge storage device is larger at the outset of the discharge.

8. The fuel cell system according to claim 7, wherein the controller is programmed to provide that the discharging means decreases an electric current value of the power generating means from the initial current value during discharge.

9. The fuel cell system according to claim 8, wherein the controller is programmed to provide that the discharging means allows the power generating means to generate the power to discharge the electric current to the current receiving means while increasing the decrease rate of the electric current value as the initial current value is higher during the discharge, until a voltage value of the power generating means is decreased to a predetermined voltage value.

10. The fuel cell system according to claim 7,
wherein the memorizing means stores a voltage value of the power generating means immediately before the idle stop unit stops the supply of the reactant gas, and
wherein the controller is programmed to provide that the initial-current-value setting means sets the initial current value on the basis of the voltage value of the power generating means and a current-voltage characteristic of the power generating means.

* * * * *